United States Patent [19]

Golinsky

[11] Patent Number: 4,613,867
[45] Date of Patent: Sep. 23, 1986

[54] PASSIVE RANGING OF AN AIRBORNE EMITTER BY A SINGLE NON-MANEUVERING OR STATIONARY SENSOR

[75] Inventor: Martin Golinsky, Roslyn Heights, N.Y.

[73] Assignee: Grumman Aerospace Corporation, Bethpage, N.Y.

[21] Appl. No.: 569,462

[22] Filed: Jan. 9, 1984

[51] Int. Cl.[4] .......................... G01S 3/02; G01S 3/52; A01C 21/00
[52] U.S. Cl. .................................. 343/458; 343/418; 364/458
[58] Field of Search ............... 343/458, 386, 407, 414, 343/418, 9 R, 464, 451; 364/451, 458, 460

[56] References Cited

U.S. PATENT DOCUMENTS

| 2,922,572 | 1/1960 | Miner et al. | 235/61.5 |
| 2,940,076 | 6/1960 | Bissett et al. | 343/112 |
| 3,029,426 | 4/1962 | Robinson, Jr. | 343/6 |
| 3,141,167 | 7/1964 | Sandretto | 343/112 |
| 3,172,108 | 3/1965 | McClure | 343/112 |
| 3,304,409 | 2/1967 | Snowdon et al. | 235/61.5 |
| 3,378,842 | 4/1968 | Phillips | 343/112 |
| 3,789,410 | 1/1974 | Smith et al. | 343/112 D |
| 3,842,419 | 10/1974 | Arndt | 343/112 D |
| 3,863,257 | 1/1975 | Kang et al. | 343/112 D |
| 3,873,984 | 3/1975 | Weisbrich, Jr. | 343/112 D |
| 3,906,189 | 9/1975 | Schmookler | 235/61.5 S |
| 3,982,246 | 9/1976 | Lubar | 343/112 C |
| 4,060,809 | 11/1977 | Baghdady | 343/364 |
| 4,179,697 | 12/1979 | Golinsky | 343/112 D |

OTHER PUBLICATIONS

"A Satellite Doppler Navigation System", by W. H. Buier and G. C. Weiffenbach, Proceedings of the Ire, vol. 48, Apr. 1960, pp. 507-516.

Primary Examiner—Theodore M. Blum
Assistant Examiner—Gregory C. Issing
Attorney, Agent, or Firm—Richard G. Geib; Daniel J. Tick; Bernard S. Hoffman

[57] ABSTRACT

A method for passively determining the range of a target vehicle relative to a non-cooperating moving test platform is disclosed. The method includes the steps of moving the test platform along a single linear path at a constant speed, while simultaneously performing a succession of bearing and frequency measurements on a radiant signal emitted by the moving target vehicle. Similarly, the test platform may remain stationary so that its velocity is zero. The measured parameters, along with knowledge of the test platform's own position and velocity, permit the range to the emitter, its velocity and its transmitted frequency to be determined.

30 Claims, 4 Drawing Figures

PASSIVE RANGING OF AN AIRBORNE EMITTER BY A SINGLE NON-MANEUVERING OR STATIONARY SENSOR

BACKGROUND OF THE INVENTION

The present invention relates to determining the range of moving targets, and more particularly, to a method of passively determining the range of moving targets from a single test platform which is either stationary, or moving at a constant velocity along a linear trajectory.

Various passive ranging systems and methods have been previously developed. In a passive ranging system the position of a target, such as an aircraft or ship, is typically determined from radiant signals emanating from the target itself, rather than echo signals developed from radiant energy being transmitted towards the target, as in active ranging systems. An advantage of a passive system is that it precludes the detection of the active tracking stations by unfriendly forces during hostilities. Generally, the systems and methods previously developed involve the use of a variety of optical, electromagnetic and acoustic sensors, as well as the use of cooperating ground based receiving and transmitting stations. Many such systems also require a plurality of cooperating sensor units, and cross-correlation equipment, as disclosed in U.S. Pat. No. 4,060,809. Such systems are generally complex, and often include operating limitations such as the ability to sense only continuously emitted signals, or the inability to be effective against targets moving at a velocity greater than the velocity of the observing vehicle itself.

Many of the problems associated with prior passive ranging systems and methods have been overcome by the passive ranging methods described in U.S. Pat. No. 4,179,697 (the '697 patent), issued Dec. 18, 1979 in the name of the present inventor, Martin Golinsky, and in U.S. Pat. No. 4,558,323, issued Dec. 10, 1985, also in the name of the present inventor. Both the '697 patent and the '323 patent disclose passive ranging methods which permit the range to an emitter target to be determined from a single moving vehicle, commonly referred to as a test platform.

In the method disclosed in the '697 patent, a single measuring aircraft is constrained to fly along a curved trajectory at a constant speed, while simultaneously performing a sequence of passive bearing measurements of the target aircraft relative to itself. Such measurements produce a geometric pattern of intersecting rays which provides the data for mathematical calculations used to determine the target's range.

In the method disclosed in the '323 patent, a single measuring aircraft is again used, however, it is constrained to fly along a linear trajectory at a non-constant speed (i.e., under acceleration or deceleration), while also simultaneously performing a sequence of passive bearing measurements of the target aircraft relative to itself. Again, such measurements are used to produce a geometric pattern of intersecting rays which also provides the data for a mathematical solution to the target's range.

Although both of these methods are valid and useful for certain applications, there are other applications where it would be desirable to passively measure the range of a target emitter without a test platform having to meet the travel constraints imposed by these prior methods. For example, it is desirable for any aircraft traveling in a normal manner, i.e., traveling along a linear trajectory at a constant velocity, to be able to readily measure the range to other aircraft without going off its assigned course or changing its normal air speed. Similarly, it is also desirable for a stationary test platform, such as an air traffic control tower, or a hovering helicopter, which are incapable of satisfying the travel constraints of the prior methods, to also be able to measure the range to other aircraft.

SUMMARY OF THE INVENTION

The foregoing problem is overcome, and other advantages are provided by a ranging method utilizing a succession of bearing and frequency measurements obtained at discrete periods of time from a radiant signal emitted by a target vehicle. In accordance with the invention, only a single measuring vehicle or test platform is required to accomplish the ranging process. The test platform carries a sensor of radiation emitted by a target vehicle. The emitted radiation may be pulsed or continuous, and its emission parameters are not known to the test platform, a priori. The emitter may therefore be a non-cooperating, hostile target. The sensor, which may include an array antenna, beam forming circuitry and frequency measuring circuitry provides bearing and frequency information about the source of radiation which is utilized to determine the range to the target aircraft. The velocity and direction of travel of the emitter may then also be calculated from this information.

The method of the present invention provides for the linear movement of a radiant energy sensor at a constant velocity. At discrete times during its displacement electrical circuitry connected to the sensor provides for a sampling of the radiant energy signal transmitted by the emitter target. As a result of the combined movement of the target and sensor there is produced a geometric pattern of rays of received radiation. The bearing angles and frequencies of these rays of radiation are measured and then mathematically combined to provide the range to the target vehicle relative to the sensor.

Although the present invention is described herein with reference to the tracking of aircraft, it should be understood that the method is equally applicable to ships employing sonic sensors and to satellites employing optical sensors. It should also be noted that certain assumptions utilized in the aforementioned Golinsky patents are also valid here. Specifically, the target whose range is to be determined is not maneuvering, and the test aircraft is at a long range from the target so that they may be considered to be in the same horizontal plane.

BRIEF DESCRIPTION OF THE DRAWINGS

In order that the invention may be readily carried into effect, it will now be described with reference to the accompanying drawings, wherein.

DESCRIPTION OF THE PREFERRED EMBODIMENT

Figure 1:
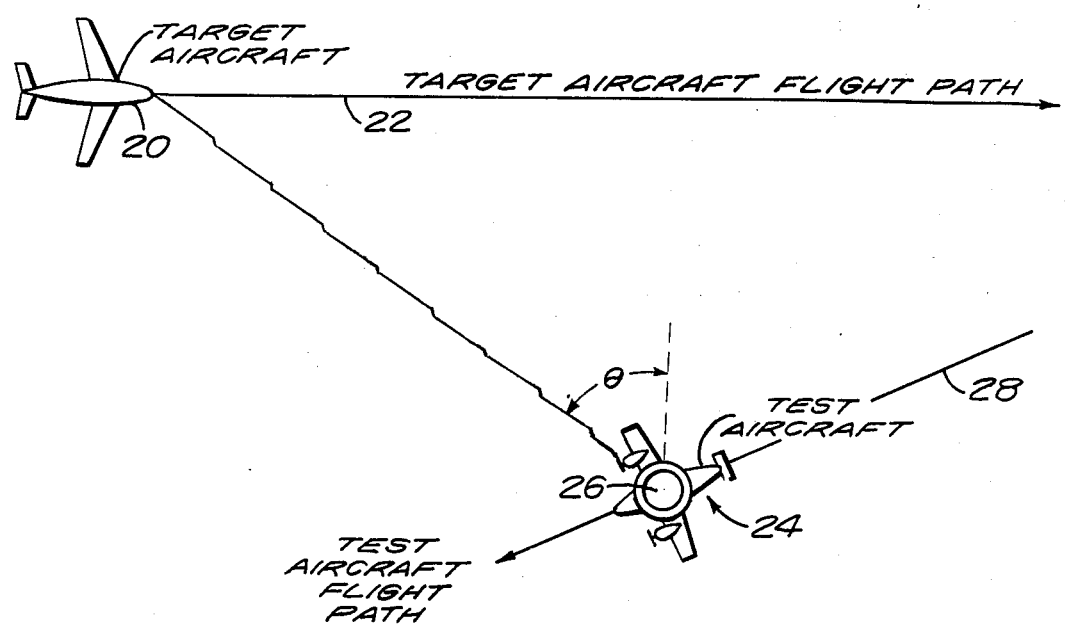
FIG. 1 is an illustration of a moving vehicle, shown as a test aircraft, carrying a sensor for receiving a radiant energy signal emitted by a target vehicle, also shown as an aircraft.

FIG. 1 illustrates a typical scenario involving the method of the present invention. A moving target 20, depicted as an aircraft which emits electromagnetic radiation, is shown traveling along a flight path 22. The path 22 is assumed to be a straight line, while the velocity of the target is assumed to be constant. A test platform 24, also depicted as an aircraft, carries a sensor 26 of the electromagnetic radiation emitted by target 20. The test platform, which is also shown to be moving along a straight path 28, is constrained to operate at a constant velocity.

Figure 2:
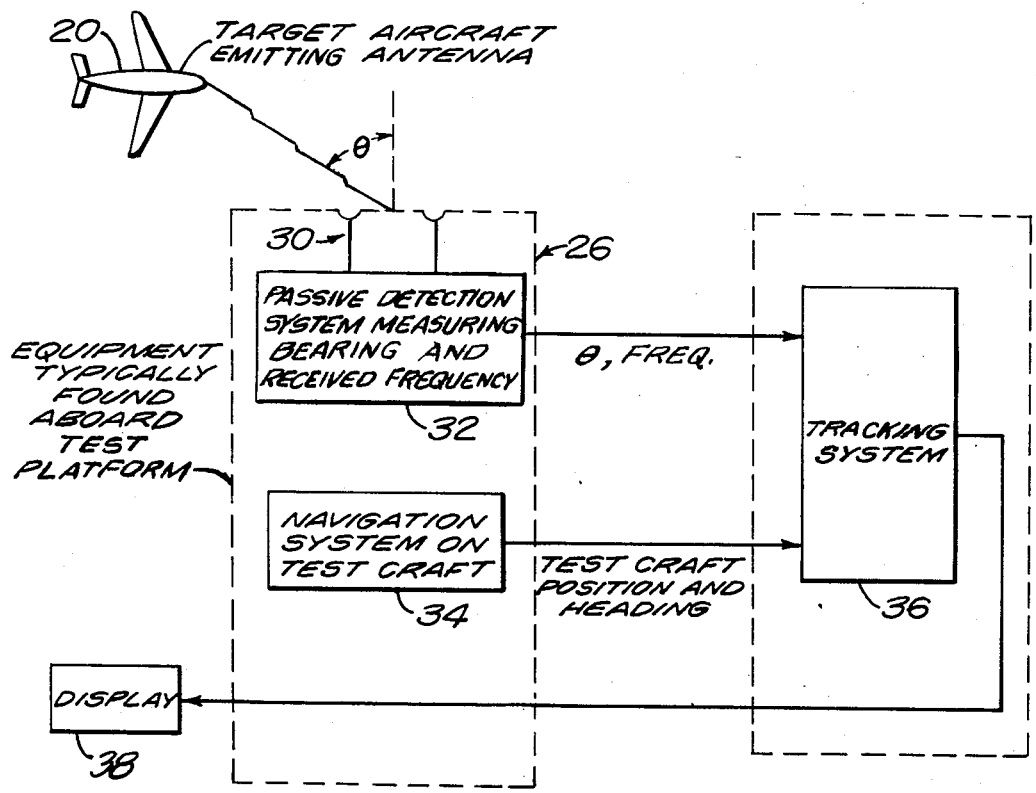
FIG. 2 is a block diagram of a passive ranging system for use with the passive ranging method of the present invention.

FIG. 2 illustrates an apparatus which could be used in implementing the present invention, and indicates how this apparatus is to be connected.

When a target, such as aircraft 20, emits an energy signal, such as a radar pulse, the test aircraft 24 receives the signal through its antenna 30, after which it is channeled into a passive detection system 32 measuring bearing and received frequency of the emitted signal. Systems of this type are available from manufacturers such as Litton Industries, Amecom Division. Litton Model No. ALR-73, is an example of such a passive detection system.

The test platform 24 also includes a navigation system 34, a tracking system 36 and a display 38. The navigation system 34 and the tracking system 36 employ well known circuitry and are available from manufacturers such as Litton Industries. Examples of these systems include Litton's navigation system ASN-92 and Litton's tracking computer OL-77/ASQ. The tracking system is capable of accomplishing the steps of the mathematical calculations required to carry out the method of the present invention as hereinafter described. In the preferred embodiment of the invention this system is used, although it should be understood that a dedicated system may also be employed. Thus, where the calculations are performed by the tracking system, the present invention only requires systems already aboard many test aircrafts, and therefore, it offers distinct advantages over systems which require additional bulky and expensive equipment.

Figure 3:
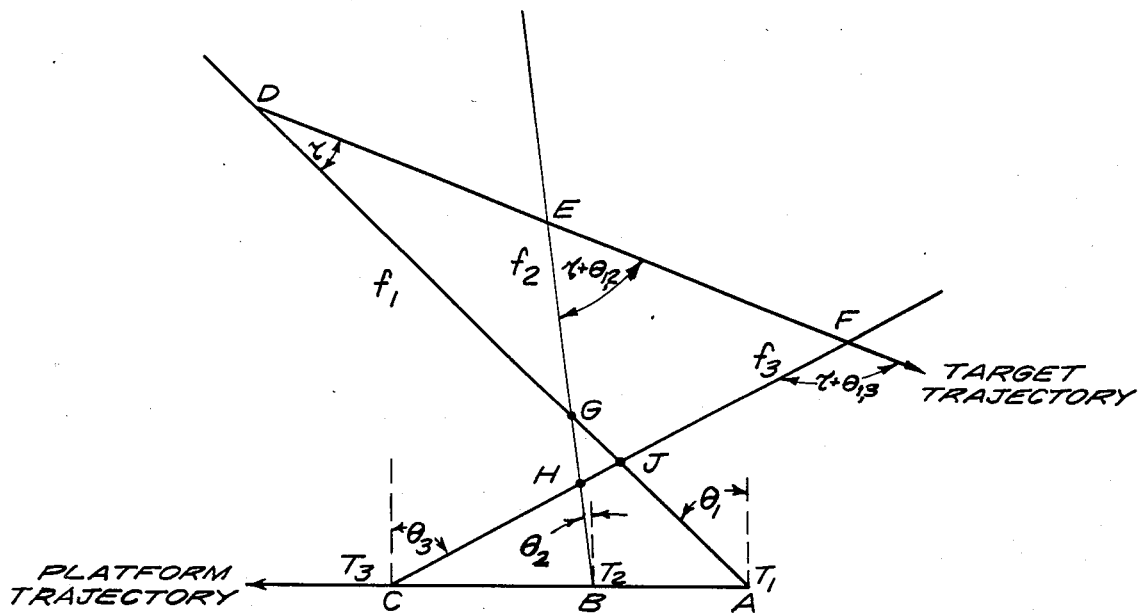
FIG. 3 is a geometric diagram which illustrates the relationship between the target aircraft and the moving test aircraft at discrete points of detection.

FIG. 3 illustrates the fundamental concept of the present invention. Vector AC shown therein represents the trajectory of test platform 24, while Vector DF represents the trajectory of target emitter 20. The test platform travels along vector AC at a constant velocity, $V_p$, so as to cross points A, B and C at times $T_1$, $T_2$ and $T_3$, respectively. Similarly, target 20 is assumed to travel along Vector DF at a constant velocity, $V_t$, so as to cross points D, E and F at times $T_1$, $T_2$ and $T_3$, respectively. In the diagram shown in FIG. 3, the time intervals between $T_1$ and $T_2$, and $T_2$ and $T_3$ are taken as being equal. Thus, the distances AB and BC traveled by the test platform during these time periods are equal, while the distances DE and EF traveled by the emitting target during these same periods, are also equal. The assumption of equal time intervals, and therefore, equal distances, is made only for the convenience of explaining the concept of the present invention. In actuality, however, the time between $T_1$ and $T_2$, and $T_2$ and $T_3$ need not be equal, and the distances traveled during such time periods by the platform and target also need not be equal.

Referring now to FIG. 3 in combination with FIG. 2, the sensor 26 of test platform 24 samples the radiant signal emitted by target 20 as the test platform crosses point A, B and C. At each of these points, the passive detection system 32 aboard the platform utilizes such samples to measure the bearing to the target aircraft 20, and the frequency of the emitter signal upon its arrival at the platform. Once these samples have been obtained, and their bearings and frequencies have been measured, tracking system 36 utilizes this data to mathematically calculate the range to target 20, as hereinafter described.

In contrast to the passive ranging methods described in the aforementioned Golinsky patents, in which measurements were required at four points along the platform's trajectory, it should be noted that the method of the present invention requires only three measurements to be made along the trajectory of the test platform. However, in the present invention since frequency measurements are required in addition to the bearing measurements utilized in the previous methods, a total of six observables are used in determining a target's range, in contrast to the four observables used in the previous methods.

For purposes of describing the method of the present invention, the values of the bearing and frequency measurements taken at times $T_1$, $T_2$ and $T_3$ are designated as $\theta_1$, $f_1$; $\theta_2$, $f_2$; and $\theta_3$, $f_3$, respectively. Generally, the three measured bearing angles will differ in value because of the geometry of the flight paths of the test platform and the target emitter. Similarly, the measured frequencies will also vary, even if the frequency transmitted by the emitter is constant, because of changing doppler shifts.

At point A, the measured frequency $f_1$ can be defined as follows:

$$f_1 = f_0 + (1/\lambda)[V_t \cos \tau + V_p \sin \theta_1] \tag{1}$$

where
- $f_0$ equals the transmission frequency of the emitter (presently unknown);
- $\lambda$ equals the transmitted wavelength;
- $\tau$ equals the angle between a bearing line, AD, to the emitter and the target velocity Vector DF;
- $\theta_1$ equals the measured bearing;
- $V_p$ equals the platform velocity (which is known by virtue of onboard navigation system 34); and
- $V_t$ equals the velocity of the target aircraft (presently unknown).

The second term of the right side of equation (1) represents the one-way doppler shift of the transmission frequency $f_0$. Similar equations can be developed to define frequencies $f_2$ and $f_3$. Thus, when test platform 24 is at points B and C, the respective measured frequencies, $f_2$ and $f_3$, are defined by the following equations:

$$f_2 = f_0 + (1/\lambda)[V_t \cos (\tau + \theta_{1,2}) + V_p \sin \theta_2] \tag{2}$$

$$f_3 = f_0 + (1/\lambda)[V_t \cos (\tau + \theta_{1,3}) + V_p \sin \theta_3] \tag{3}$$

where
- $\theta_2$ equals the measured bearing at point B
- $\theta_3$ equals the measured bearing at point C
- $\theta_{1,2}$ equals $\theta_1 - \theta_2$
- $\theta_{1,3}$ equals $\theta_1 - \theta_3$ and the other parameters have been previously defined. All angles are measured positive in a counter-clockwise direction. Thus, in FIG. 3, $\theta_3$ would have a negative value.

Previous equations 1-3, set forth above, contain three unknowns, $\tau$, $V_t$ and $f_0$. These equations can, therefore, be solved for these unknowns, yielding the following equations:

$$f_0 = \frac{f_1 \sin \theta_{2,3} - f_2 \sin \theta_{1,3} + f_3 \sin \theta_{1,2}}{\sin \theta_{1,2} - \sin \theta_{1,3} + \sin \theta_{2,3} + \frac{V_p}{c}(\sin \theta_3 \sin \theta_{1,2} - \sin \theta_2 \sin \theta_{1,3} + \sin \theta_1 \sin \theta_{2,3})} \quad (4)$$

where
$\theta_{2,3} = \theta_2 - \theta_3$, and
c equals the velocity of propagation of electromagnetic waves.

$$\tau = \tan^{-1}\left[\frac{\cos\theta_{1,2} - \left(\frac{f_2 - f_0 - \frac{V_p f_0}{c}\sin\theta_2}{f_1 - f_0 - \frac{V_p f_0}{c}\sin\theta_1}\right)}{\sin\theta_{1,2}}\right] \quad (5)$$

The value of $\tau$ can be readily solved because every variable on the right side of equation 5 is known by reason of the fact that $f_0$ has been calculated using equation 4. It should be noted that by retaining the signs of the numerator and denominator of the argument, the usual angular ambiguity associated with the arc tangent is resolved.

The last unknown $V_t$ is determined from the following equation:

$$V_t = \frac{\left(\frac{f_1}{f_0} - 1\right)c - V_p \sin\theta_1}{\cos\tau} \quad (6)$$

Having calculated the values of the unknowns $V_t$ and $\tau$, and knowing the time interval T between measurements (which equals the time periods between $T_1$ and $T_2$, and $T_2$ and $T_3$), it is then possible to solve for the unknown ranges from the test platform 24 to the target aircraft 20, i.e., AD, BE and CF shown in FIG. 3. Thus, $$DE = EF = V_t T \quad (7)$$

while, $$AB = BC = V_p T \quad (8)$$

$$GA = AB \frac{\cos\theta_2}{\sin\theta_{1,2}} \quad (9)$$

$$GD = DE \frac{\sin(\tau + \theta_{1,2})}{\sin\theta_{1,2}} \quad (10)$$

Therefore, the range to target 20 at point A is AD which is defined as follows:

$$AD = AG + GD = \frac{1}{\sin\theta_{1,2}}[AB \cos\theta_2 + DE \sin(\tau + \theta_{1,2})] \quad (11)$$

where all quantities on the right side of equation 11 are known. Similarly, the range to target 20 at points B and C is BE and CF, respectively. They are defined as follows:

$$BE = EG + GB = \frac{1}{\sin\theta_{1,2}}[AB \cos\theta_1 + DE \sin\tau] \quad (12)$$

$$CF = CJ + JF = \frac{2}{\sin\theta_{1,3}}[AB \cos\theta_1 + DE \sin\tau] \quad (13)$$

Thus, the solutions to equations 11, 12 and 13 represent the ranges at any sample points A, B and C from a test platform to a moving emitter where the test platform is traversing a linear course at a constant velocity. Once this range information has been calculated, it can be used to determine the velocity and direction of travel of the emitter target using the standard on-board systems of the test platform.

Figure 4:
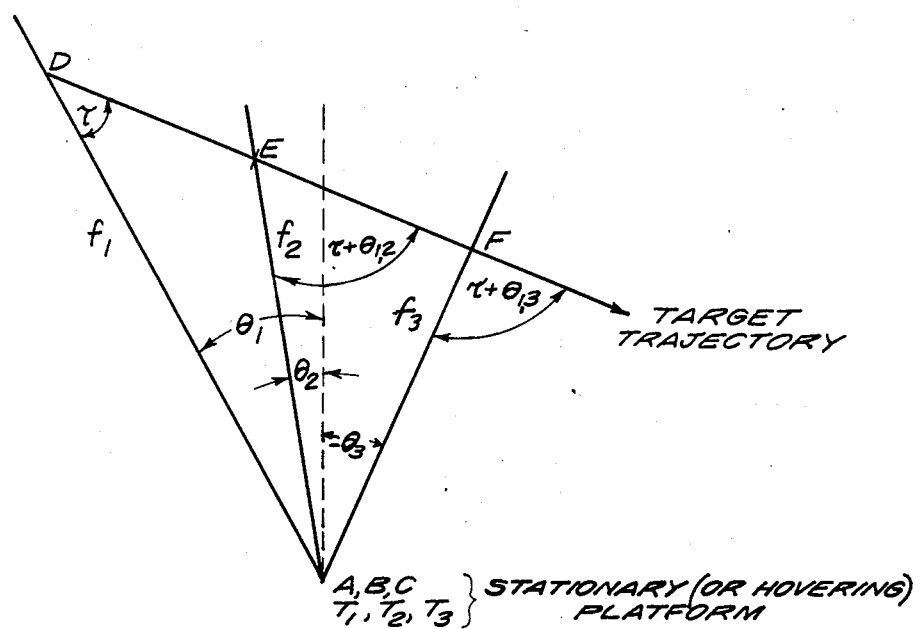
FIG. 4 is a geometric diagram which illustrates the relationship between the target aircraft and a stationary test platform at a single point of detection.

FIG. 4 illustrates the fundamental concept of the present invention where the test platform is stationary. Examples of this type of application include an air traffic control tower, a hovering helicopter, or an anchored ship. Here, since the velocity of the test platform is zero, $V_p$ is set equal zero in equations 1, 2 and 3. Notwithstanding this, the method of determining the range to the emitter target at points D, E and F is still the same. AD, BE and CF then represent ranges from a common point A to the moving emitter, since points B and C are now co-located with point A.

To improve the accuracy of the calculated range in the presence of measurement errors, the measurements made at times $T_2$ and $T_3$ may be used with a fourth measurement to update the range calculation. This updating may be continued for as long as desired.

It is obvious that the present invention can be used in a number of military applications. It should be noted, however, that in addition to such military applications, the present invention may also be used in commercial applications such as, for example, an aid to air traffic control. In such applications, the transmission frequency, $f_0$, would be known. As such, only two sample points, e.g., A and B, rather than three would then be needed, resulting in a reduced time interval required to determine the applicable range to the target emitter.

The calculations used to carry out the invention can be performed in essentially real time on different sets of three measurements, where each set is determined by the passive detection system to have resulted from a distinct emitter. Therefore, the number of emitters that may be positioned by the technique is limited only by the number of allocated track files in the tracking system.

It is to be understood that a number of variations may be made in the invention without departing from its spirit and scope. The terms and expressions which have been employed are used in a descriptive and not a limiting sense, and no intention of excluding equivalents of the invention described and claimed is made.

What is claimed is:

1. A method of passively determining the range to a moving target from a single test platform, said method comprising the steps of
   traveling at a constant velocity a course in the test platform which is straight;

detecting at said platform the presence of an energy signal radiating from the target, and sampling said energy signal at three discrete times;

generating for each of said energy signal samples a first detection signal responsive to its angle of arrival at said platform, and a second detection signal responsive to its frequency on arrival at said platform;

storing said detection signals;

determining the range to said target utilizing said stored detection signals and said test platform velocity and position; and generating a target indication signal representative of the range of said target.

2. A method as recited in claim 1, wherein the step of determining the range to the target comprises calculating the transmission frequency of said energy supply;

calculating an angle between a bearing line to said target and the course of said target at a first of said discrete sample times utilizing said transmission frequency;

calculating the velocity of said target utilizing said calculated angle; and determining the range to said target utilizing said calculated angle and said target velocity.

3. A method as recited in claim 1, wherein said test platform is stationary so that its velocity is equal to zero.

4. A method as recited in claim 1, wherein said transmission frequency of said energy signal is known, and wherein said energy signal is, therefore, sampled at only two discrete times.

5. A method as recited in claim 1, wherein said test platform and said target are at essentially the same altitude, and wherein both are flying horizontally.

6. A method as recited in claim 1, wherein the step of sampling comprises receiving a continuously generated energy signal.

7. A method as recited in claim 1, wherein the step of sampling comprises receiving pulsed energy signals.

8. A method as recited in claim 1, wherein the step of sampling comprises receiving a continuously generated radar signal.

9. The method as recited in claim 1, wherein the step of sampling comprises receiving a pulsed radar signal.

10. The method as recited in claim 1, wherein the step of sampling comprises receiving a continuously generated energy signal of the class of signals consisting of optical frequency signals and sonic signals.

11. The method as recited in claim 1, wherein the step of sampling comprises receiving a pulsed energy signal of the class of energy signals consisting of optical frequency signals and sonic signals.

12. A method of passively determining the range to a moving airborne target from a single test aircraft, said method comprising the steps of traversing a linear path in the test aircraft at a constant velocity;

sampling at said test aircraft a radio signal emitted by the target at three discrete times;

generating for each of said samples a first detection signal responsive to its angle of arrival at said test aircraft, and a second detection signal responsive to its frequency on arrival at said test aircraft;

determining the range to said airborne target utilizing said first and second detection signals and said test aircraft velocity; and generating a target indication signal representative of the range to said target.

13. A method as recited in claim 12, wherein said transmission frequency of said radio signal is known, and wherein said radio signal is, therefore, sampled at only two discrete times.

14. A method as recited in claim 12, wherein said test aircraft is stationary so that its velocity is equal to zero.

15. A method as recited in claim 12, wherein said test aircraft and said airborne target are at essentially the same altitude, and wherein both are flying horizontally.

16. A method of passively determining the range to a target from a test platform, said method comprising the steps of traveling at a constant velocity a course in the test platform which is straight;

detecting at said platform the presence of an energy signal radiating from the target, and sampling said energy signal at three discrete times;

generating for each of said energy signal samples a first detection signal responsive to its angle of arrival at said platform, and a second detection signal responsive to its frequency on arrival at said platform;

storing said detection signals;

determining the range to said target utilizing said stored detection signals and said test platform velocity and position, including calculating the transmission frequency of said energy signal, calculating an angle between a bearing line to said target and the course of said target at a first of said discrete sample times utilizing said transmission frequency, calculating the velocity of said target utilizing said calculated angle, and determining the range to said target utilizing said calculated angle and said target velocity; and generating a target indication signal representative of the range of said target.

17. A method as recited in claim 16, wherein said test platform is stationary so that its velocity is equal to zero.

18. A method as recited in claim 16, wherein said transmission frequency of said energy signal is known, and wherein said energy signal is, therefore, sampled at only two discrete times.

19. A method as recited in claim 16, wherein said test platform and said target are at essentially the same altitude, and wherein both are flying horizontally.

20. A method as recited in claim 16, wherein the step of sampling comprises receiving a continuously generated energy signal.

21. A method as recited in claim 16, wherein the step of sampling comprises receiving pulsed energy signals.

22. A method as recited in claim 16, wherein the step of sampling comprises receiving a continuously generated radar signal.

23. The method as recited in claim 16, wherein the step of sampling comprises receiving a pulsed radar signal.

24. The method as recited in claim 16, wherein the step of sampling comprises receiving a continuously generated energy signal of the class of signals consisting of optical frequency signals and sonic signals.

25. The method as recited in claim 16, wherein the step of sampling comprises receiving a pulsed energy signal of the class of energy signals consisting of optical frequency signals and sonic signals.

26. A method of passively determining the range to an airborne target from a test aircraft, said method comprising the steps of traversing a linear path in the test aircraft at a constant velocity;

sampling at said test aircraft a radio signal emitted by the target at three discrete times;

generating for each of said samples a first detection signal responsive to its angle of arrival at said test aircraft, and a second detection signal responsive to its frequency on arrival at said test aircraft;

determining the range to said airborne target utilizing said first and second detection signals and said test aircraft velocity, including calculating the transmission frequency of said energy signal, calculating an angle between a bearing line to said target and the course of said target at a first of said discrete sample times utilizing said transmission frequency, calculating the velocity of said target utilizing said calculated angle, and determining the range to said target utilizing said calculated angle and said target velocity; and generating a target indication signal representative of the range to said target.

27. A method as recited in claim 26, wherein said transmission frequency of said radio signal is known, and wherein said radio signal is, therefore, sampled at only two discrete times.

28. A method as recited in claim 26, wherein said test aircraft is stationary so that its velocity is equal to zero.

29. A method as recited in claim 26, wherein said test aircraft and said airborne target are at essentially the same altitude, and wherein both are flying horizontally.

30. A method as recited in claim 1, further comprising the steps of determining the velocity of said target and determining the frequency transmitted from said target.

* * * * *